United States Patent Office 3,471,475
Patented Oct. 7, 1969

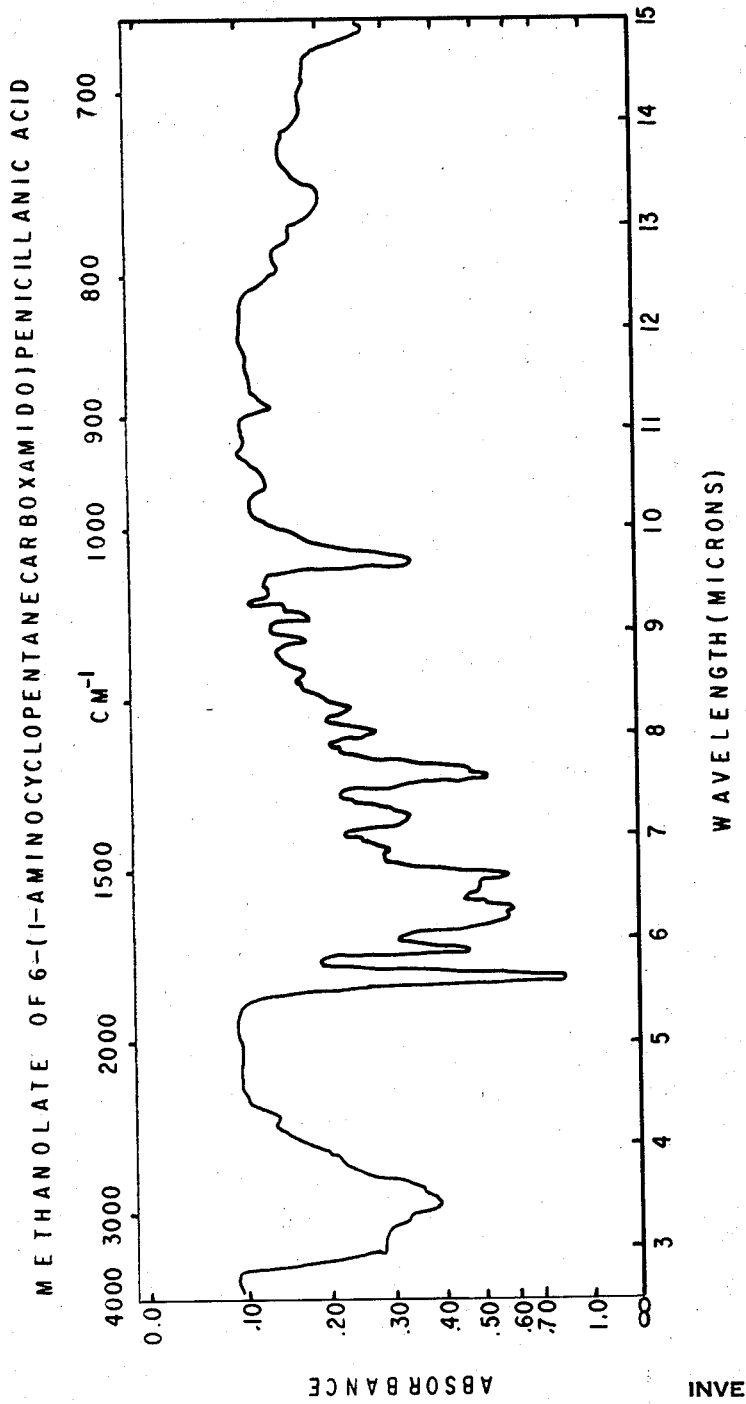

3,471,475
6-(1-AMINOCYCLOPENTANECARBOXAMIDO)
PENICILLANIC ACID METHANOLATE
Donald E. Clark, Norristown, and Norman H. Grant,
Wynnewood, Pa., assignors to American Home Products Corporation, New York, N.Y., a corporation of Delaware
Filed June 28, 1967, Ser. No. 651,647
Int. Cl. C07d 99/16, 99/14; A61k 21/00
U.S. Cl. 260—239.1                                      9 Claims

ABSTRACT OF THE DISCLOSURE

The present invention is concerned with alkanolates of 6 - (1 - aminocyclopentanecarboxamido) penicillanic acid which are useful intermediates in the preparation of the anhydrate of 6-(1-aminocyclopentanecarboxamido) penicillanic acid. Further this invention is concerned with the processes of preparing these alkanolates and their subsequent conversion to the anhydrate form.

---

This invention relates to new and novel alkanolates of 6 - (1 - aminocyclopentanecarboxamido) penicillanic acid and the method for their preparation. Further this invention is concerned with the process of converting these new and novel alkanolates of 6-(1-aminocyclopentanecarboxamido) penicillanic acid to the corresponding anhydrate form.

The hydrated form of 6-(1-aminocyclopentanecarboxamido) penicillanic acid is already described in the prior art in United States Patent No. 3,194,802 wherein a simple and economic method for the production thereof is disclosed. By the terminology "hydrated" as used herein is specifically meant those crystalline forms which have at least one molecule of water bound chemically per molecule of the pencillin. The 6-(1-aminocyclopentanecarboxamido) penicillanic acid in the previously known forms is of recognized value for its broad spectrum antibacterial activity and is useful as a therapeutical agent in poultry and in mammals and particularly, in man, in the treatment of infectious diseases caused by gram-positive and gram-negative bacteria, upon parenteral or oral administration. The compound also has use as a nutritional supplement in animal food.

As disclosed in United States Patent No. 3,194,802, the hydrated form of 6-(1-aminocyclopentanecarboxamido) penicillanic acid is prepared by reacting N-carboxyaminocyclopentanecarboxylic acid anhydrate with 6-aminopenicillanic acid (6–APA). It is there disclosed that the reaction should take place in a cold aqueous solution, which is stirred for several hours at a temperature from just above the freezing point of the aqueous mixture to about 37° C., and preferably in the range of 0–10° C.

The 6-(1-aminocyclopentanecarboxamido) penicillanic acid prepared by the foregoing procedure contains from about 3 percent to about 8 percent water, as determined by the Karl Fischer method. This indicates that this compound, as prepared above, has been in the form of its hydrate; e.g. at least as the monohydrate.

The anhydrate of 6 - (1 - aminocyclopentanecarboxamido) penicillanic acid and a method for its preparation have been described and claimed in copending U.S. patent application, Ser. No. 549,895, filed on May 13, 1966, and entitled "Dehydrated Crystalline 6-(1-Aminocycloalkylcarboxamido) Penicillanic Acids" now abandoned.

The new and novel compounds of the present invention are depicted by the following formula:

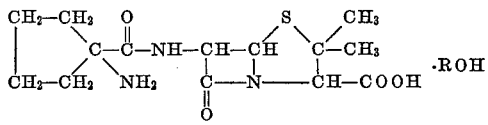

wherein R is lower alkyl. As employed herein lower alkyl is meant to include an alkyl moiety having from 1 to 2 carbon atoms e.g. methyl, and ethyl. Typical examples of the alkanolates of the present invention are: the methanolate of 6-(1-aminocyclopentanecarboxamido) penicillanic acid; and the ethanolate of 6-(1-aminocyclopentanecarboxamido) penicillanic acid.

Figure 1:
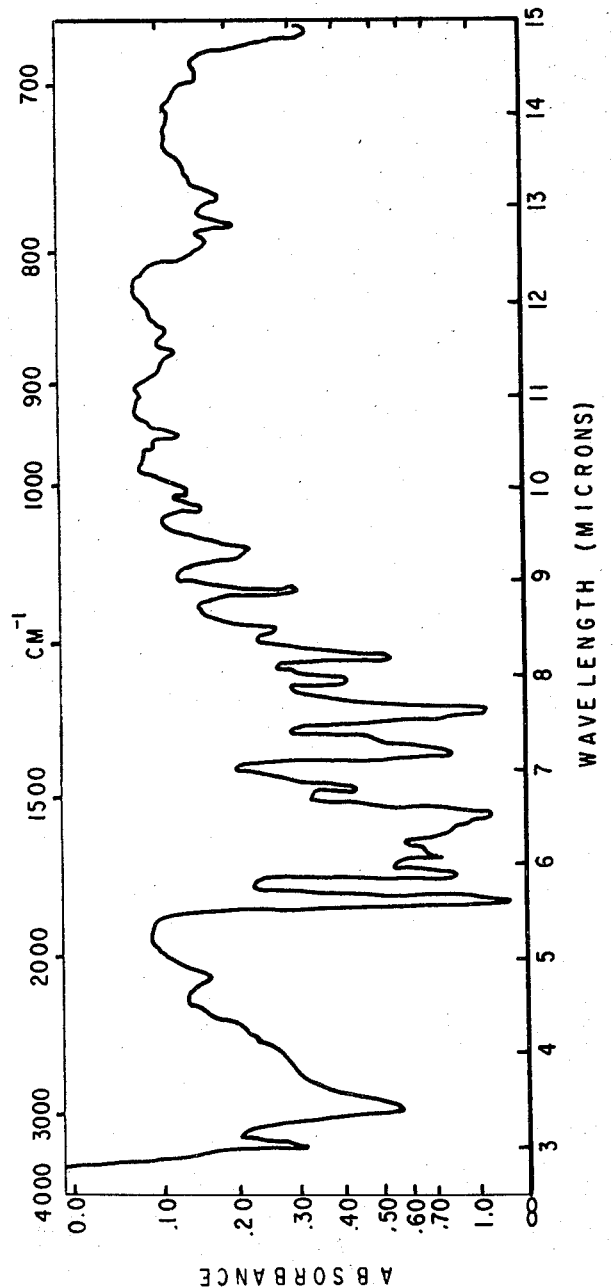
Figure 2:
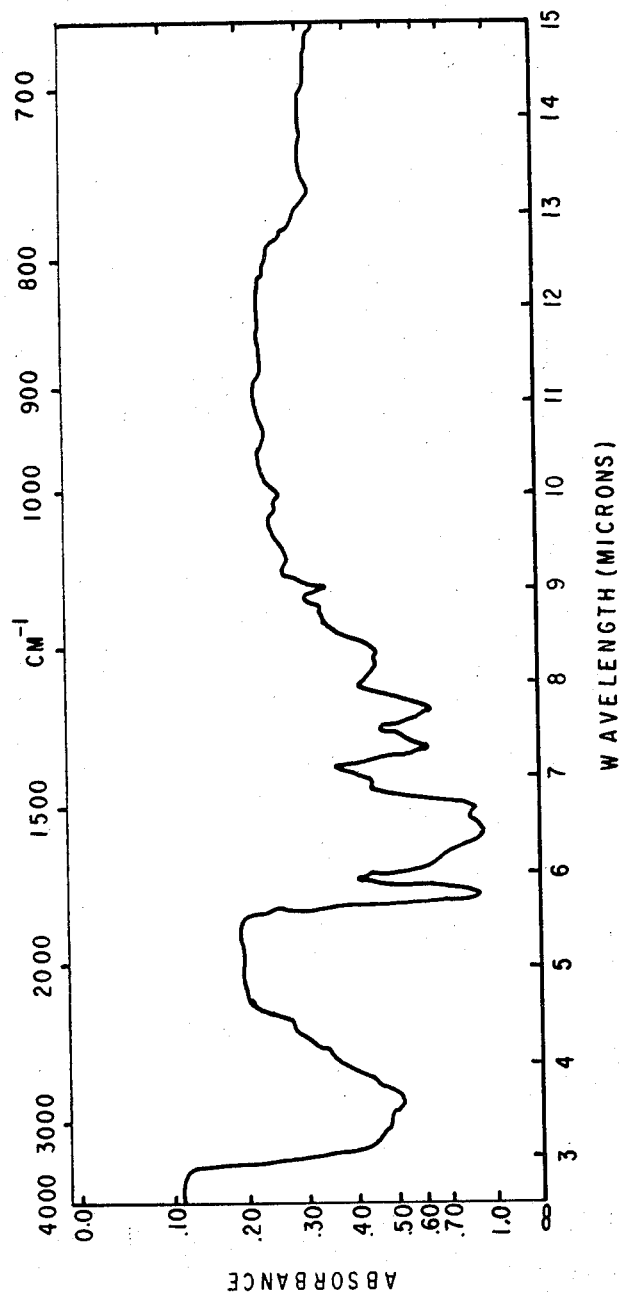

The new and novel alkanolates of this invention are characterized by the fact that they are not hydrated and can be easily converted to the anhydrate of 6-(1-aminocyclopentanecarboxamido) penicillanic acid. Further, the novel alkanolates of the present invention e.g. the methanolate have crystal structures differing in an essential way from their known counterparts e.g. the hydrate and anhydrate, as demonstrated by their differing infrared spectrographs, as appears in FIGURES 1–3 of the drawings.

A new and novel process of the present invention for the preparation of the alkanolates of 6-(1-aminocyclopentanecarboxamido) penicillanic acid comprises admixing the corresponding known hydrated compound with a lower alkanol e.g. methanol, and ethanol, and stirring the resulting mixture until the alkanolation is complete. Preferably this stirring is continued for a period of about five to about thirty minutes. When the alkanolation reaction is complete, the resulting product is separated by conventional procedures e.g. filtration.

Another new and novel process of the present invention is the conversion of alkanolates of the present invention to the anhydrate form of 6-(1-aminocyclopentanecarboxamido) penicillanic acid. This dealkanolization reaction is effected by heating an appropriate solid alkanolate e.g. the methanolate, the ethanolate, at a temperature range from about 40° C. to about 100° C. for a period of about five to about thirty minutes. Preferably this reaction is conducted at about 60° C. for a period of about fifteen minutes. In this manner, the appropriate alkanolate is converted to the anhydrate of 6-(1-aminocyclopentanecarboxamido) penicillanic acid which has been found to have greater stability on storage than the hydrated form thereof. Further, because of the stability of the anhydrate, coupled with its greater density, the efficiency of the production of the capsule dosage form thereof is increased.

As above demonstrated, the alkanolates of 6-(1-aminocyclopentanecarboxamido) penicillanic acid of the present invention are useful intermediates in the preparation of the corresponding anhydrate which possesses the above described stability advantages without sacrificing the therapeutic effectiveness thereof. On the contrary, the effectiveness of the partially anhydrous compounds prepared by the process of this invention is substantially equal to that of the hydrated compounds on a weight-by-weight basis. For example, when mice are challenged intraperitoneally with a penicillin-sensitive strain of S. aureus and a virulent strain of S. typhosa, and both the hydrated types of compounds and the anhydrated forms prepared by the present invention are administered by the oral route to the separately infected mice, equal protection is afforded by both types of compounds. Further, it has been demonstrated that when this anhydrate is dissolved in water, it is apparently identical to hydrated compound dissolved in water and can be made to crystallize as the known hydrated form by the lower temperature, lesser water content crystallization procedures already known. No evidence has been found that the anhydrate compound prepared by the process of this invention will change to its corresponding hydrated form in the solid state. Further, the anhydrate is readily converted to form the known hydrate by dissolving the former in water at any pH and crystallizing below 40° C., or freeze-drying.

The following examples are illustrative of the invention, but are not to be considered necessarily limitative thereof.

EXAMPLE I

To a mixture of 344 grams of 6-aminopenicillanic acid (6–APA) and 21 grams of sodium bicarbonate in 1.5 liters or water there is added at half hour intervals three 8.3 gram portions of N-carboxy-aminocyclopentanecarboxylic acid anhydride. After stirring for two hours at room temperature, the mixture is stirred overnight at +5° C. The system is filtered and the insoluble residue is washed twice with water. The product weighs 351 grams, and analysis shows it to be the monohydrate. Twenty grams are stirred for fifteen minutes at room temperature with 200 ml. of anhydrous methanol and then filtered. In this manner is obtained the methanolate of 6-(1-aminocyclopentanecarboxamido) penicillanic acid (21.3 g.) which possesses an infrared spectrum which differs from both the monohydrate and the anhydrate.

Calcd. for $C_{14}H_{21}N_3O_4S \cdot CH_3OH$: C, 50.2; H, 6.41; N, 11.7. Found: C, 50.1; H, 6.61; N, 11.4.

The above prepared methanolate is warmed at 60° C. for fifteen minutes to afford the anhydrate of 6-(1-aminocyclopentanecarboxamido) penicillanic acid.

EXAMPLE II

Ten grams of the monohydrate of 6-(1-aminocyclopentanecarboxamido) penicillanic acid are admixed and stirred with 100 ml. of ethanol for five minutes. Thereafter, the mixture is filtered to afford the ethanolate of 6 - (1- aminocyclopentanecarboxamido) penicillanic acid which is then heated to 100° C. for five minutes to yield the anhydrate of 6-(1-aminocyclopentanecarboxamido) penicillanic acid.

EXAMPLE III

Five grams of hydrated 6-(1-aminocyclopentanecarboxamido) penicillanic acid are stirred with 50 ml. of methanol for ten minutes. Thereafter, the mixture is filtered to afford the methanolate of 6-(1-aminocyclopentanecarboxamido) penicillanic acid which is then heated to 40° C. for thirty minutes to yield the corresponding anhydrate.

What is claimed is:

1. A compound selected from the group consisting of those having the formula:

wherein R is selected from the group consisting of methyl and ethyl.

2. A compound as described in claim 1 which is: the methanolate of 6 - (1 - aminocyclopentanecarboxamido) penicillanic acid.

3. A compound as described in claim 1 which is: the ethanolate of 6-(1-aminocyclopentanecarboxamido) penicillanic acid.

4. A process for the preparation of a compound having the formula:

wherein R is selected from the group consisting of methyl and ethyl which comprises contacting a hydrated 6-(1-aminocyclopentanecarboxamido) penicillanic acid with a lower alkanol selected from the group consisting of methanol and ethanol for a period of about five to about thirty minutes.

5. A process as described in claim 4 wherein the lower alkanol is methanol.

6. A process as described in claim 4 wherein the lower alkanol is ethanol.

7. A process for the preparation of anhydrous 6-(1-aminocyclopentanecarboxamido) penicillanic acid which comprises heating a compound having the formula:

wherein R is selected from the group consisting of methyl and ethyl at a temperature from about 40° C. to about 100° C. for a period of about five to about thirty minutes.

8. A process as described in claim 7 for the preparation of anhydrous 6-(1-aminocyclopentanecarboxamido) penicillanic acid which comprises heating the methanolate of 6 - (1 - aminocyclopentanecarboxamido) penicillanic acid at 60° C. for a period of about fifteen minutes.

9. A process as described in claim 8 for the preparation of anhydrous 6-(1-aminocyclopentanecarboxamido) penicillanic acid which comprises heating the ethanolate of 6 - (1 - aminocyclopentanecarboxamido) penicillanic acid at 60° C. for a period of about fifteen minutes.

References Cited

UNITED STATES PATENTS 3,194,802   7/1965   Alburn et al. _____ 260—239.1

NICHOLAS S. RIZZO, Primary Examiner

U.S. Cl. X.R.

260—999